(12) United States Patent
Bouchard

(10) Patent No.: US 11,208,306 B2
(45) Date of Patent: Dec. 28, 2021

(54) CABLE BLOCK

(71) Applicant: JPF TÉLÉBLOC INC., Alma (CA)

(72) Inventor: Guillaume Bouchard, Alma (CA)

(73) Assignee: JPF TÉLÉBLOC INC., Alma (CA)

( * ) Notice: Subject to any disclaimer, the term of this patent is extended or adjusted under 35 U.S.C. 154(b) by 242 days.

(21) Appl. No.: 16/523,083

(22) Filed: Jul. 26, 2019

(65) Prior Publication Data

US 2020/0032928 A1 Jan. 30, 2020

Related U.S. Application Data

(60) Provisional application No. 62/711,222, filed on Jul. 27, 2018.

(51) Int. Cl.
| | | |
|---|---|---|
| *B66D 3/04* | (2006.01) | |
| *F16L 3/12* | (2006.01) | |
| *F16L 3/18* | (2006.01) | |
| *H02G 3/30* | (2006.01) | |

(52) U.S. Cl.
CPC ............ *B66D 3/046* (2013.01); *F16L 3/1218* (2013.01); *F16L 3/18* (2013.01); *H02G 3/30* (2013.01)

(58) Field of Classification Search
CPC .......... F16L 3/1218; F16L 3/18; B66D 3/046; H02G 3/30
See application file for complete search history.

(56) References Cited

U.S. PATENT DOCUMENTS

| | | | | |
|---|---|---|---|---|
| 516,268 | A * | 3/1894 | Hartz ..................... | B66D 3/046 254/405 |
| 670,974 | A * | 4/1901 | Tarbox .................. | B66D 3/046 254/405 |
| 991,649 | A * | 5/1911 | Russell ................. | B66D 3/046 254/405 |
| 1,164,919 | A * | 12/1915 | Carlson ................. | B66D 3/046 254/405 |
| 1,243,847 | A * | 10/1917 | McGiffert ............. | B66D 3/046 254/405 |
| 1,625,910 | A | 4/1927 | Ramsey | |
| 1,766,357 | A * | 6/1930 | Robertson ................ | B66C 1/34 254/405 |

(Continued)

FOREIGN PATENT DOCUMENTS

| | | |
|---|---|---|
| AU | 2016101554 A4 | 10/2016 |
| CN | 204886015 U | 12/2015 |

(Continued)

*Primary Examiner* — Eret C McNichols
(74) *Attorney, Agent, or Firm* — Hayes Soloway P.C.

(57) ABSTRACT

A cable block including a frame having an upper section and a lower section together defining an inner opening. The lower section has a main sheave rotatably connected thereto, with a section of the main sheave defining a lower portion of the inner opening. The upper section is hingedly connected to the lower section at a pivot point, with a lever extending on an opposite side of the pivot point than the remaining of the upper section. The lever is configured to extend into the inner opening and be engageable with the support cable, when the cable block is configured in the open configuration, and to drive the upper section in rotation upon a force being exerted on the lever by the support cable, to move the cable block from an open configuration to a closed configuration.

19 Claims, 12 Drawing Sheets

(56) References Cited

U.S. PATENT DOCUMENTS

| | | |
|---|---|---|
| 2,269,768 A | 1/1942 | Keeney |
| 2,566,233 A | 8/1951 | Makie |
| 2,946,559 A | 7/1960 | Pickett |
| 3,084,892 A | 4/1963 | Priestley et al. |
| 3,134,575 A | 5/1964 | Walter |
| 3,199,841 A * | 8/1965 | McKean ................ B66D 3/046 254/405 |
| 4,019,715 A | 4/1977 | Vugrek |
| 4,129,287 A * | 12/1978 | Lindsey .................. H02G 1/04 254/134.3 PA |
| 4,475,715 A | 10/1984 | Asplin, Sr. |
| 4,549,723 A | 10/1985 | Castilano |
| 5,615,865 A | 4/1997 | Fountain |
| 5,821,469 A | 10/1998 | Shanmugham |
| 6,129,033 A | 10/2000 | Jarrell |
| 6,129,340 A | 10/2000 | Daniel |
| 6,185,792 B1 | 2/2001 | Nelson et al. |
| 6,315,269 B1 | 11/2001 | Fleury et al. |
| 6,375,163 B1 * | 4/2002 | Carlson .................... H02G 1/04 254/134.3 PA |
| 6,540,207 B1 | 4/2003 | Barnes |
| 8,282,078 B2 | 10/2012 | Ballard |
| 9,350,145 B2 | 5/2016 | Jean et al. |
| 9,856,896 B2 | 1/2018 | Chua |
| 2014/0138496 A1 | 5/2014 | Jones |

FOREIGN PATENT DOCUMENTS

| | | |
|---|---|---|
| CN | 206931933 U | 1/2018 |
| GB | 2431779 B | 10/2010 |
| WO | 9926326 A1 | 5/1999 |

\* cited by examiner

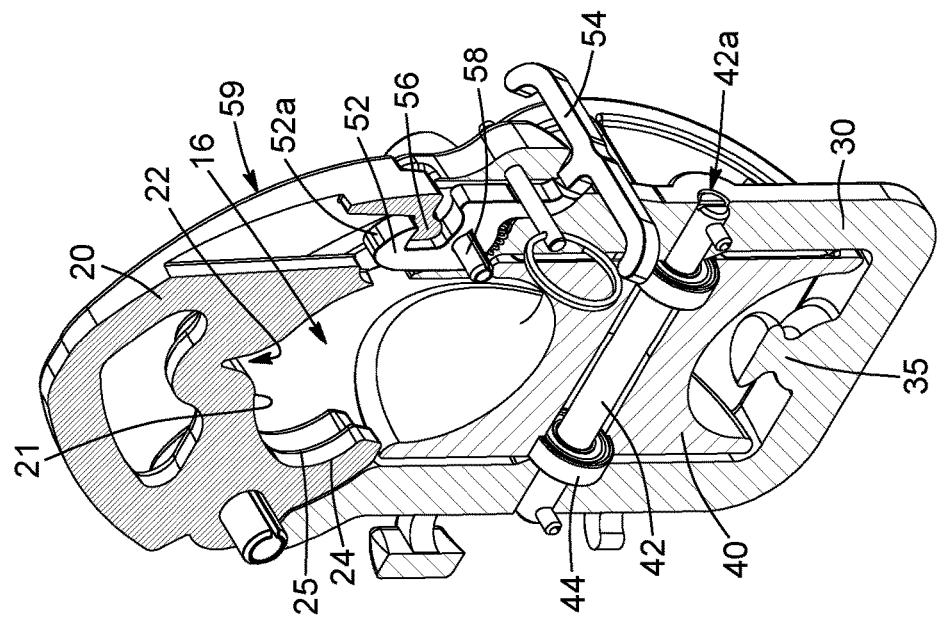
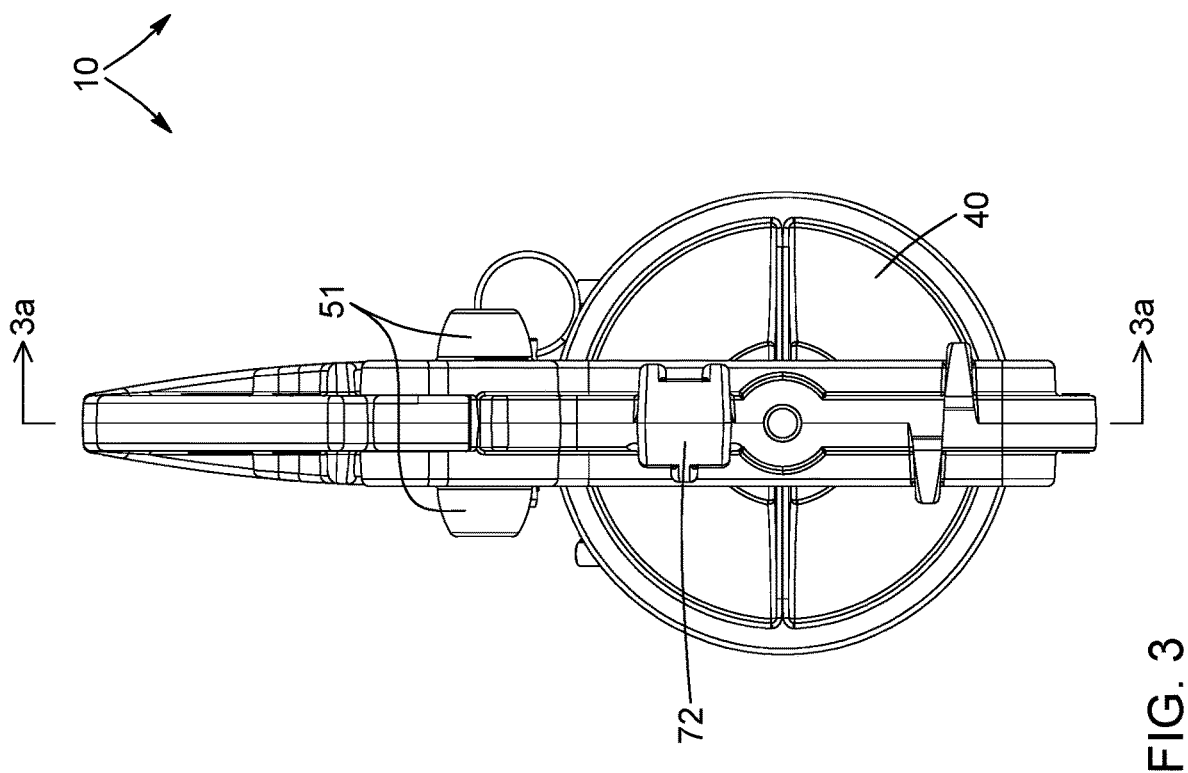
FIG. 3a
FIG. 3

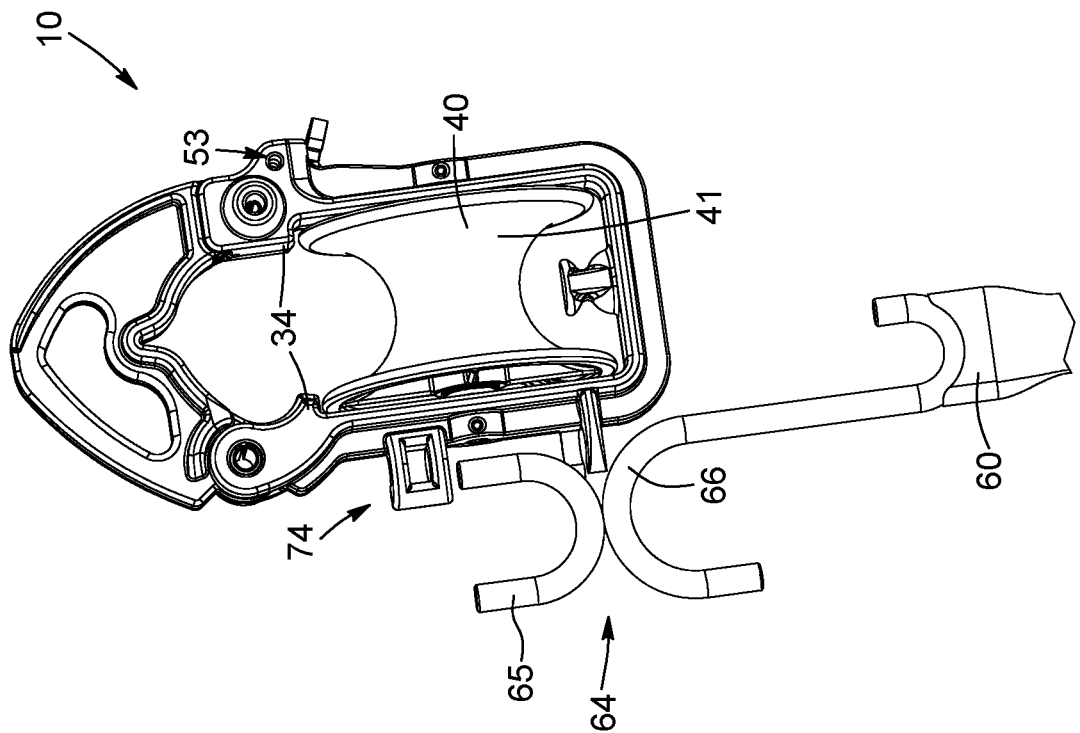
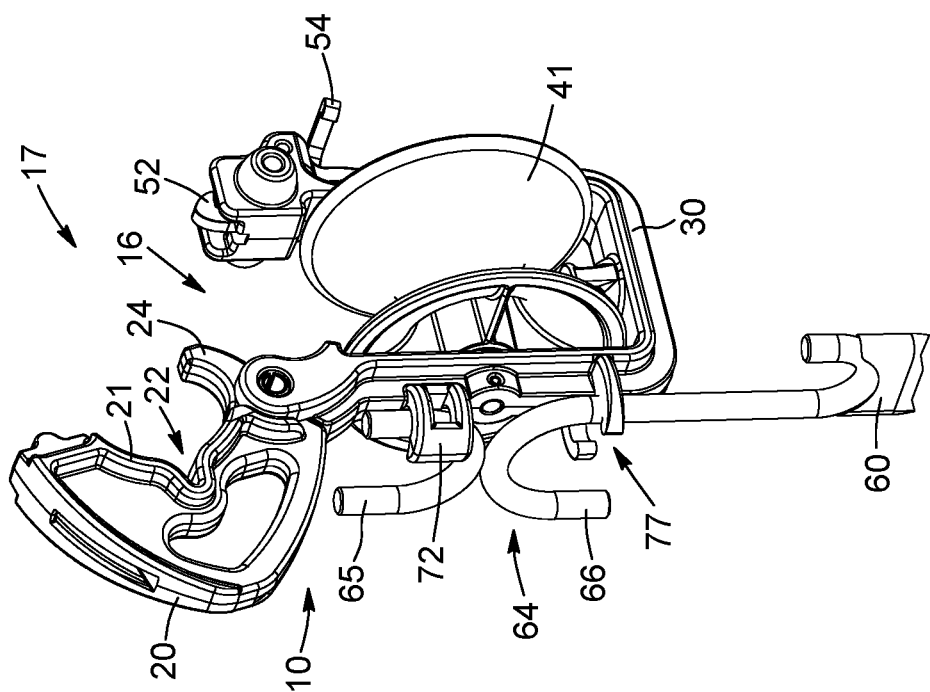

CABLE BLOCK

CROSS-REFERENCE TO RELATED APPLICATIONS

This application claims priority under 35USC § 119(e) of US provisional patent application 62/711,222 filed on Jul. 27, 2018, the specification of which being hereby incorporated by reference.

TECHNICAL FIELD OF THE INVENTION

The present invention relates to the field of cable blocks. More particularly, it relates to cable blocks having specific improved characteristics, for example and without being limitative, allowing easy installation and removal thereof on/from a strand (or support cable), from the ground and from various angles and/or above obstacles such as a river, a road, a ravine or the like.

BACKGROUND

Cable blocks are known in the art to help in the installation of aerial cables, such as, for example and without being limitative, aerial telecommunication cables. More particularly, cable blocks are used to temporarily maintain the aerial cable in a vicinity of a support cable (commonly called "strand") prior to a subsequent step where the aerial cable is secured to the support cable. For example and without being limitative, the securing of the aerial cable to the support cable can be performed using a lashing method or the like, using a dedicated apparatus.

Cable blocks typically include a frame having an inner opening defined therein, to receive the aerial cable and the support cable; a closure mechanism to selectively open and close the inner opening and therefore temporarily maintain the cables within the inner opening once inserted therein; and at least one pulley engageable with the aerial cable for guiding and allowing smooth movement of the aerial cable. Cable blocks are typically installed and retrieved manually when the support cable is reachable by an installator, for example using a bucket truck. To provide greater installation flexibility, some cable blocks are designed and configured to be used in combination with an installation pole, such as, for example and without being limitative, a dedicated telescopic pole, which allows an installator to install the cable blocks on the support cable, from the ground, by mounting the cable block onto the pole and guiding the pole to move the cable block upwardly to engage the cable block with the support cable (i.e. to insert the support cable in the inner opening of the frame and close the inner opening, using the closure mechanism).

Known cable blocks however tend to suffer from several drawbacks. Amongst others, it is commonly challenging for installators standing on the ground, often at a great distance from the support cable to insert the support cable in the inner opening of the frame of the cable block and close the closure mechanism. Moreover, known cable blocks do not have a dedicated mechanism, which allows the cable block to be secured to an additional supporting link, such as a rope, used for positioning and maintaining the cable blocks at a pre-determined distance from one another on the support cable, for example when installing cable blocks on a support cable positioned over an obstacle such as a river, a road, a ravine or the like.

In view of the above, there is a need for an improved cable block which, by virtue of its design and components, would be able to overcome or at least minimize some of the above-discussed prior art concerns.

SUMMARY OF THE INVENTION

According to a first general aspect, there is provided a cable block engageable with a support cable and configurable in an open configuration and a closed configuration. The cable block comprises a frame having an upper section and a lower section hingedly connected to one another and together defining an inner opening of the frame shaped and sized to receive the support cable. The lower section of the frame has a main sheave rotatably connected thereto, with a section of the main sheave defining a lower portion of the inner opening. The upper section has a hinge connecting end hingedly connected to the lower section of the frame at a pivot point, with a lever extending on an opposite side of the pivot point than the remaining of the upper section of the frame at the hinge connecting end. The lever is configured to extend into the inner opening and be engageable with the support cable, when the cable block is configured in the open configuration, and to drive the upper section of the frame in rotation upon a force being exerted on the lever by the support cable, to move the cable block from the open configuration to the closed configuration.

In accordance with another general aspect, there is also provided a cable block engageable with a support cable and configurable between an open configuration and a closed configuration. The cable block comprises a frame having an upper section and a lower section hingedly connected to one another at a pivot point and together defining an inner opening having a lower portion and being shaped and sized to receive the support cable; and a main sheave rotatably mounted to the frame in the lower section thereof and having a section defining the lower portion of the inner opening. The upper section of the frame comprises: a hinge connecting end hingedly connected to the lower section of the frame at the pivot point; and a lever defined at the hinge connecting end and extending on an opposite side of the pivot point than the remaining of the upper section of the frame. The lever is configured to extend into the inner opening and be engageable with the support cable, when the cable block is configured in the open configuration, and to drive the upper section of the frame in rotation upon a force being exerted on the lever by the support cable, to move the cable block from the open configuration to the closed configuration.

In an embodiment, the upper section of the frame comprises an inner surface defining a support cable engagement section having a concave profile and extending along at least a portion of the lever, the concave profile being opened upwardly, when the cable block is configured in the open configuration.

In an embodiment, a bottom of the support cable engagement section is substantially vertically aligned with the pivot point of the upper section of the frame.

In an embodiment, the lever has an arcuate profile.

In an embodiment, the lower section of the frame includes a lever receiving depression sized and shaped to receive at least a section of the lever, when the cable block is configured in the closed configuration.

In an embodiment, the lever receiving depression is sized and shaped to allow a section of the lever to extend into the inner opening of the frame when the cable block is configured in the closed configuration.

In an embodiment, the cable block further comprises a latch pivotable between a locking position and a release position, the latch being configured to releasably lock the cable block in the closed configuration upon transition of the cable block from the open configuration to the closed configuration.

In an embodiment, the cable block is configured to be used in combination with an installation pole. The latch includes a T-shaped latch engagement member engageable with a section of the installation pole to pivot the latch between the locking position and the release position.

In an embodiment, the frame includes a pole engaging section substantially matching the shape of a portion of the section of the installation pole and engageable therewith to support the cable block on the section of the installation pole when the section of the installation pole is simultaneously engaged with the T-shaped latch engagement member and the pole engaging section.

In an embodiment, the frame includes latch engaging projections engageable by the section of the installation pole simultaneously with the T-shaped latch engagement member, to pivot the latch between the locking position and the release position.

In an embodiment, the lower section of the frame further includes a pole connecting assembly configured to selectively mount the cable block to a cable block engaging member of the installation pole and selectively securely maintain the cable block thereon.

In an embodiment, the pole connecting assembly includes an upper connector projecting laterally from an outer surface of the lower section of the frame, on a corresponding side thereof. The pole connecting assembly has a pole receiving bore defined therein and a lower connector also projecting laterally from the outer surface of the lower section of the frame, on the same side as the upper connector. The lower connector is C-shaped and defines a hollow inner section with an insertion channel.

In an embodiment, the frame defines a close structure preventing retrieval of the support cable therefrom, when the frame is configured in the closed configuration.

In an embodiment, the lower section of the frame has an outer surface and the pivot point is substantially vertically aligned with a section of the outer surface of the lower section of the frame.

In an embodiment, each one of the upper section and the lower section of the frame comprises an outer abutment shoulder positioned proximate to the pivot point and abuttable with one another when the cable block is configured in the open configuration to limit the pivoting of the upper section of the frame to a predetermined maximal angular distance.

In an embodiment, the maximum angular distance ranges between about 61° and about 110°.

In accordance with another general aspect, there is further provided a cable block engageable with a support cable and an additional supporting link. The cable block comprises: a frame defining an inner opening shaped and sized to receive the support cable therein; a main sheave rotatably connected to the frame, with a section of the main sheave defining a lower portion of the inner opening; and a jaw extending outside of the inner opening of the frame. The jaw defines a support link receiving cavity opened laterally and configured to receive the additional supporting link therein. The jaw further includes a series of teeth selectively projecting in the support link receiving cavity to engage the additional support link and frictionally secure the cable block on the additional supporting link.

In an embodiment, the series of teeth are defined in a support link wedging member movable along a longitudinal axis of the cable block and the support link wedging member is biased upwardly to bias the series of teeth towards the support link receiving cavity.

In an embodiment, the support link wedging member includes a push down section projecting from an upper surface of the jaw, when the series of teeth project in the support link receiving cavity.

In an embodiment, the top of the push down section of the support link wedging member and the upper surface of the jaw each have a concave profile.

In an embodiment, each tooth of the series of teeth has an arcuate profile, with each tooth being curved towards the inside of the support link receiving cavity.

In an embodiment, each tooth of the series of teeth has an apex, the apexes of the teeth of the series of teeth together defining an inclined plane oriented towards an inner end of the support link receiving cavity.

In an embodiment, the cable block further comprises: a support cable engaging sheave rotatably mounted to the frame and positioned in the sheave receiving cavity; and a sheave lock mountable in the sheave receiving cavity of the frame, over the support cable engaging sheave. The sheave lock includes a V-shaped notch sized and shaped to wedge the support cable therein, when the cable block is installed on the support cable.

In accordance with another general aspect, there is further provided a cable block engageable with a support cable and an additional supporting link. The cable block comprises: a frame defining an inner opening shaped and sized to receive the support cable therein, the frame including a sheave receiving cavity opened in the inner opening, at an upper end of the frame; a main sheave rotatably connected to the frame, with a section of the main sheave defining a lower portion of the inner opening; a support cable engaging sheave rotatably mounted to the frame and positioned in the sheave receiving cavity; and a sheave lock mountable in the sheave receiving cavity of the frame, over the support cable engaging sheave. The sheave lock includes a V-shaped notch sized and shaped to wedge the support cable therein, when the cable block is installed on the support cable.

In an embodiment, the cable block further comprises a jaw positioned outside of the inner opening of the frame. The jaw defines a support link receiving cavity opened laterally, for receiving the additional supporting link. The jaw includes a series of teeth selectively projecting in the support link receiving cavity to engage the additional support link and securely maintain the position of the cable block on the additional supporting link.

In an embodiment, the series of teeth are included in a support link wedging member movable along a longitudinal axis of the cable block. The support link wedging member is biased upwardly to bias the series of teeth towards the support link receiving cavity.

In an embodiment, the jaw includes an upper surface and the support link wedging member includes a push down section projecting from the upper surface of the jaw, when the series of teeth project in the support link receiving cavity.

In an embodiment, the top of the push down section of the support link wedging member and the upper surface of the jaw each have a concave profile.

In an embodiment, each tooth of the series of teeth has an arcuate profile, with each tooth being curved towards the inside of the support link receiving cavity In an embodiment, each tooth of the series of teeth has an apex, the apexes of the teeth of the series of teeth together defining an inclined plane oriented towards an inner end of the support link receiving cavity.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 3 is a left side elevation view of the cable block of FIG. 1, shown in the closed configuration.

FIG. 3*a* is a cross-sectional view of the cable block of FIG. 1, taken along lines A-A in FIG. 3.

FIG. 4 is an isometric view of the cable block of FIG. 1, shown in an open configuration and mounted on an installation pole.

FIG. 5 is an isometric view of the cable block of FIG. 1, shown in the closed configuration and disengaged from the installation pole.

DETAILED DESCRIPTION

Figure 1:
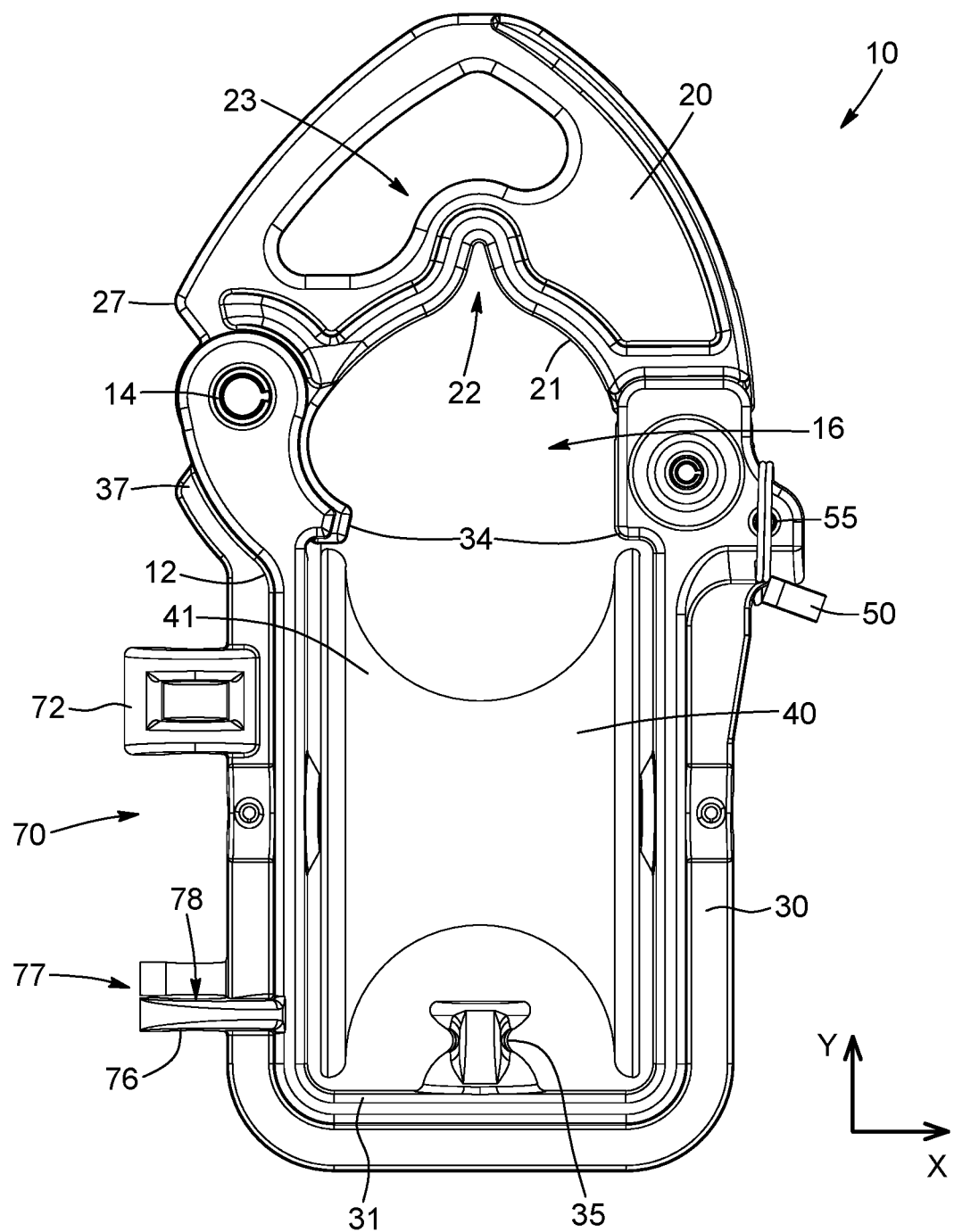
FIG. 1 is a front elevation view of a cable block in accordance with a first embodiment and shown in a closed configuration.
Figure 2:
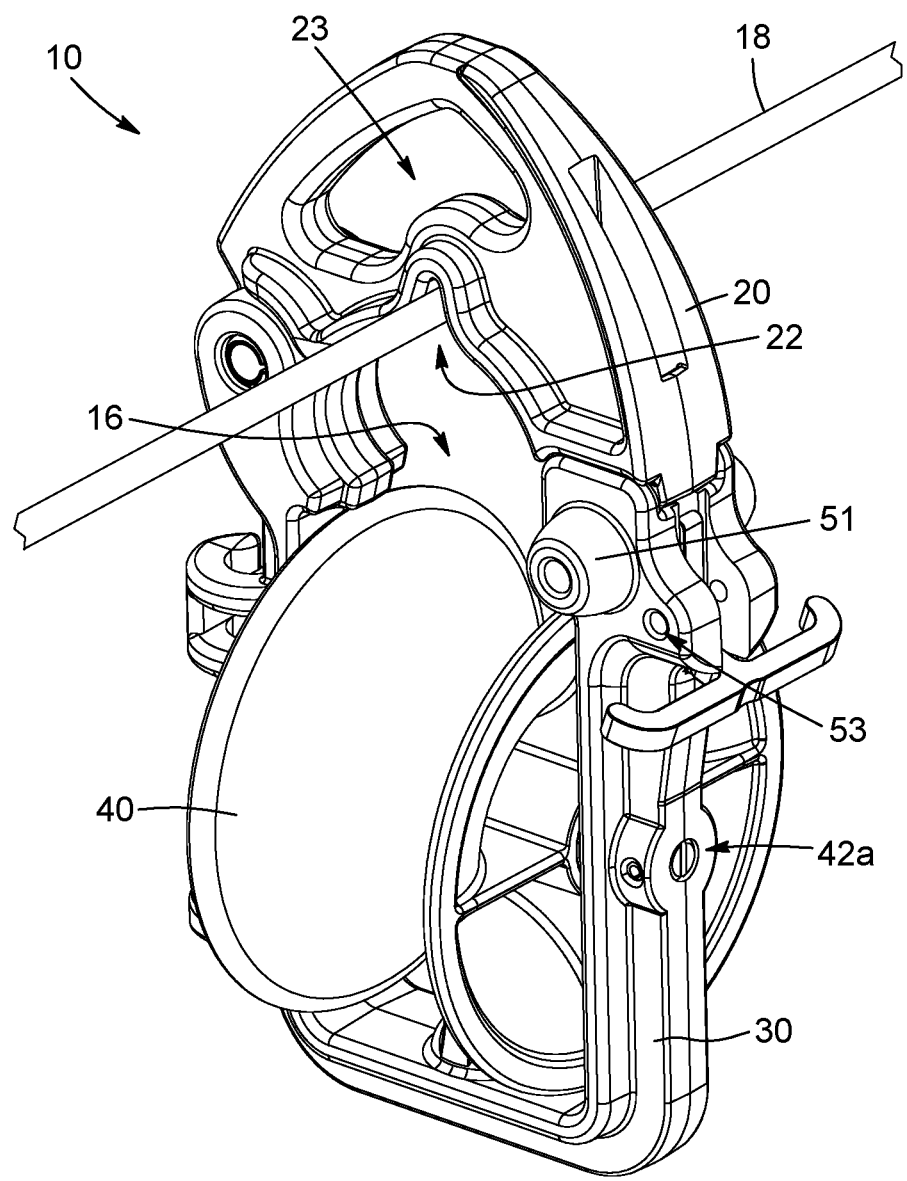
FIG. 2 is an isometric view of the cable block of FIG. 1, where the cable block is shown in the closed configuration and mounted on a support cable.
Figure 7:
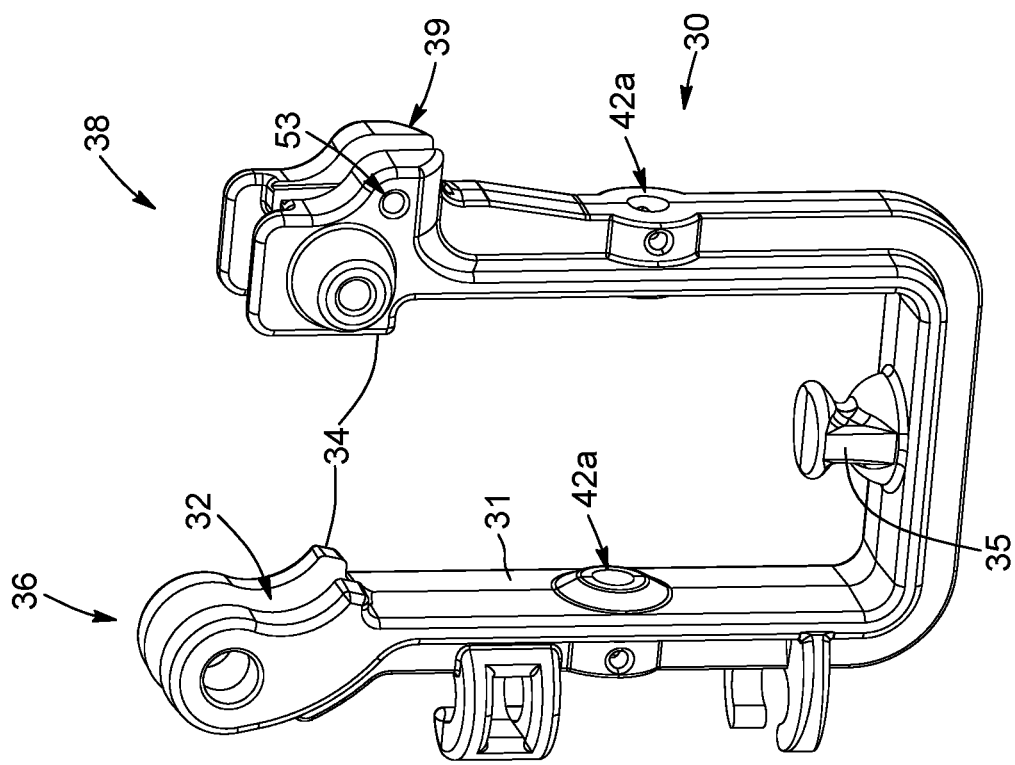
FIG. 7 is an isometric view of the lower section of the cable block of FIG. 1.
Figure 6:
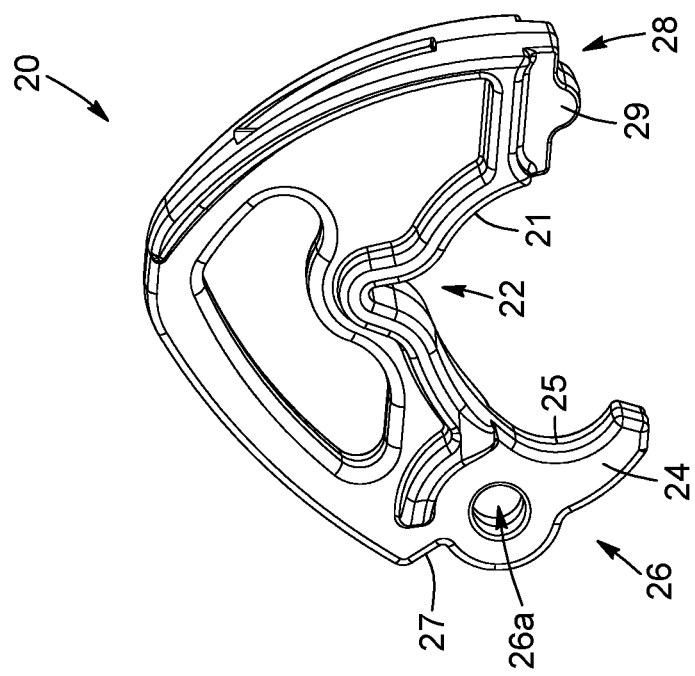
FIG. 6 is an isometric view of the upper section of the cable block of FIG. 1.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the cable block and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the cable block, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

Referring generally to FIGS. 1 to 7, in accordance with one embodiment, there is provided a cable block 10. The cable block 10 includes a frame 12 having an upper section 20 and a lower section 30 hingedly connected to one another by a hinge 14. The upper section 20 and the lower section 30 of the frame 12 of the cable block 10 together define an inner opening 16 sized and shaped to receive therein a support cable 18, for installation of the cable block 10 and at least one aerial cable (not shown) to be subsequently secured to the support cable 18. When both the support cable 18 and the aerial cable(s) (not shown) are received in the inner opening 16, the cable block 10 can maintain the aerial cable(s) (not shown) in close proximity to the support cable 18, awaiting securement of the aerial cable(s) (not shown) to the support cable 18. One skilled in the art will understand that, in the course of the present description, the term "support cable" is used to refer to any type of cable, rod, rope or the like, or any group thereof, which is used to support the cable block 10. In an embodiment, the support cable is a strand.

In an embodiment, the upper section 20 of the frame 12 has a hinge connecting end 26 at a lower end thereof and a latch end 28 at an opposed lower end, spaced apart from the hinge connecting end 26. The hinge connecting end 26 of the upper section 20 of the frame 12 is the section of the upper section 20 of the frame 12 hingedly connected to the lower section 30 of the frame 12 at a pivot point 26*a*, while the latch end 28 of the upper section 20 of the frame 12 is the section selectively engageable to the lower section 30 of the frame 12, as the cable block 10 is moved between the open configuration and the closed configuration, as will be described in more details below.

The lower section 30 of the frame 12 also includes a hinge connecting end 36 at an upper end thereof and a latch end 38 at an opposed upper end, spaced apart from the hinge connecting end 36. The hinge connecting end 36 of the lower section 30 of the frame 12 is the section of the lower section 30 of the frame 12 hingedly connected to the hinge connecting end 26 of the upper section 20 of the frame 12, while the latch end 38 of the lower section 30 of the frame 12 is the section selectively engageable to the latch end 28 of the upper section 20 of the frame 12, as the cable block 10 is moved between the open configuration and the closed configuration, as will be described in more details below.

The cable block 10 is configurable between an open configuration (shown in FIG. 4) and a closed configuration (shown in FIG. 1) by means of the hinge 14. A latch 50 is provided to lock the cable block 10 in the closed configuration. In other words, the hinge 14 allows pivoting of the upper section 20 away from the lower section 30, to move the cable block 10 between the open configuration (shown in FIG. 4) and the closed configuration (shown in FIG. 1). Hence, in the open configuration, the latch end 28 of the upper section 20 is spaced apart from the latch end 38 of the lower section 30 of the frame 12, thereby defining an insertion channel 17 for the support cable 18 to be inserted in the inner opening 16. In other words, in the open configuration, the frame 12 does not form a closed structure around the inner opening 16 and therefore provides a channel 17 to allow the cable block 10 to be positioned with the support cable 18 extending inside the inner opening 16. In the closed configuration, the latch end 28 of the upper section 20 is engaged to the latch end 38 of the lower section 30 of the frame 12, the upper section 20 and the lower section 30 of the frame 12 thereby defining a closed structure around the inner opening 16 and preventing removal of a cable from the inner opening 16 (or preventing the cable block 10 from inadvertently being disengaged from the support cable 18).

The closed structure defined by the frame 12, around the inner opening 16, in the closed configuration, provides increased rigidity to the cable block 10 and substantially prevents deformation of the frame 12 under the forces exerted thereon by the weight of the cables being supported by the cable block 10 in operating conditions. Moreover, the hinged connection between the upper section 20 and the lower section 30 of the frame 12 enables installation and removal of the cable block 10 onto a support cable, from various positions from the ground, using an installation pole 60 (see FIG. 10), as will be described in more details below.

Figure 10:
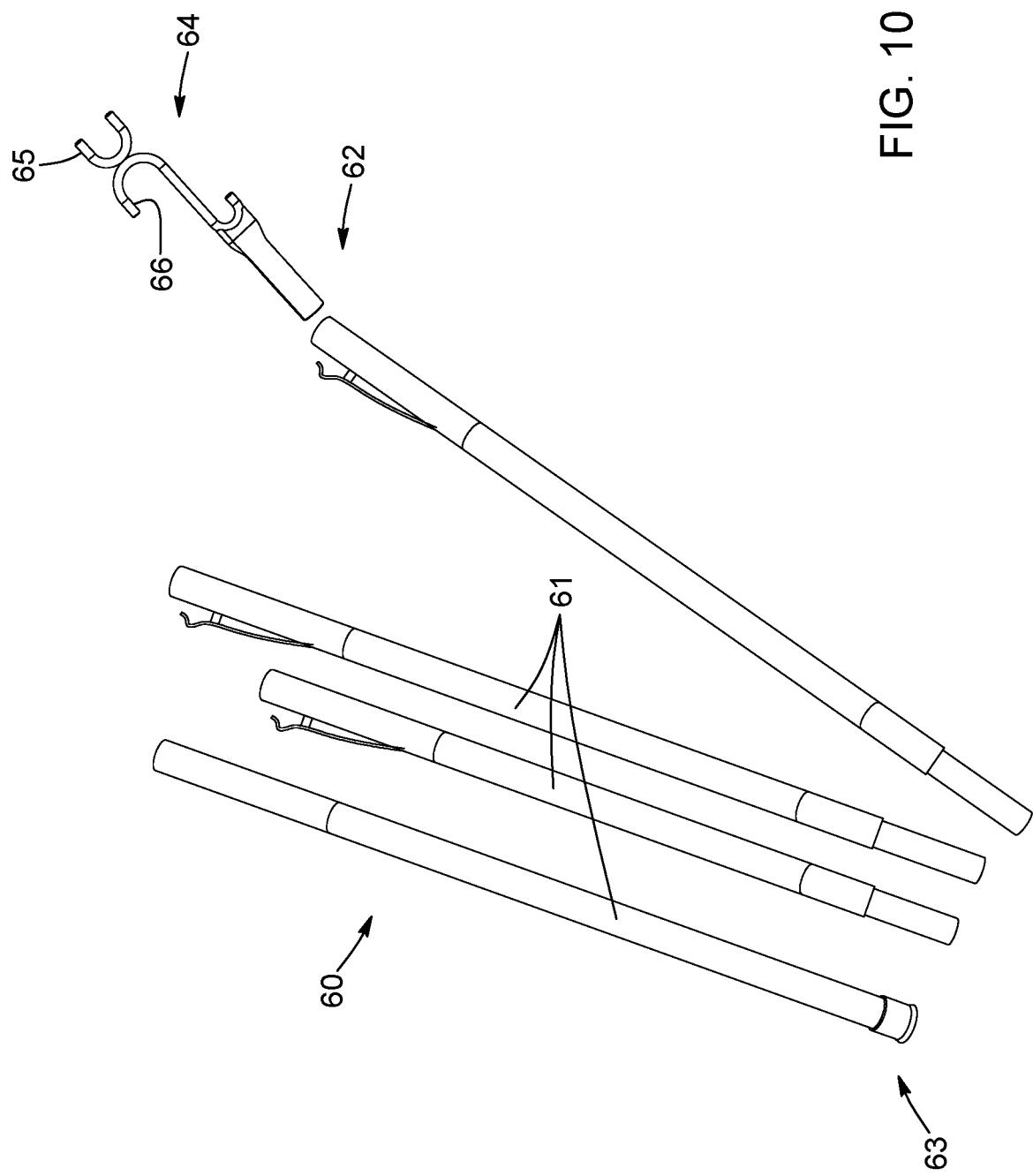
FIG. 10 is an isometric view of an installation pole, in accordance with an embodiment.

Referring to FIG. 10, an installation pole 60 in accordance with an embodiment is shown. The installation pole 60 includes a shaft 61 having a distal end 62 and a proximal end 63. In the embodiment shown, the shaft 61 includes several sections connectable to one another. A cable block engaging member 64 is provided at the distal end 62 of the shaft. In the embodiment shown, the cable block engaging member 64 includes a U-shaped upper section 65 and a hook 66, with the U-shaped upper section 65 being mounted to the hook 66 such that they are open in opposite direction (i.e. the U-shaped upper section 65 is opened upwardly while the hook 66 is opened downwardly with outer surfaces thereof being connected). One skilled in the art will however understand that, in an alternative embodiment (not shown), the cable block engaging member 64 could be different than the cable block engaging member 64 of the embodiment shown, while still allowing selective engagement of the installation pole with the cable block 10.

Referring back to FIGS. 1 to 7, in the embodiment shown, the upper section 20 of the frame 12 has a concave inner surface 21, with a V-shaped notch 22 opened in the inner surface 21 and extending upwardly therefrom. The V-shaped notch 22 is sized and shaped to wedge the support cable 18 therein once the cable block 10 is installed on the support cable 18 and the cable block 10 is configured in the closed configuration (see FIG. 2). In more details, when the support cable 18 is wedged in the V-shaped notch 22, the support cable 18 is maintained therein in a friction fit, therefore resulting in sufficient friction between the cable block 10 and the support cable 18 to substantially prevent the cable block 10 from moving along the support cable 18, for example during the installation (or unwinding) of the aerial cable(s) (not shown), while still allowing movement of the cable block 10 along the support cable 18 when sufficient force is applied on the cable block 10. In the embodiment shown, the V-shaped notch 22 is positioned centrally along a transversal axis X of the upper section 20 of the frame 12, to allow the cable block 10 to be balanced on the support cable 18 wedged in the V-shaped notch 22. In the embodiment shown, the upper section 20 of the frame 12 also includes a handle 23.

The upper section 20 of the frame 12 also comprises a lever 24 defined at the hinge connecting end 26. The lever 24 is a section of the upper section 20 of the frame 12 extending on an opposite side of the pivot point 26a than the remaining of the upper section 20 of the frame 12, at the hinge connecting end 26. The lever 24 is designed (i.e. it is positioned, shaped and sized) to drive the upper section 20 of the frame 12 in rotation, upon a force being exerted on the lever 24 by the support cable 18, to move the cable block 10 from the open configuration to the closed configuration. For example and without being limitative, a force can be exerted on the lever 24 by the support cable 18, when the support cable 18 is engaged with the lever 24 as the cable block 10 is pushed upwardly by an installator (for example using an installation pole 60 mounted to the cable block 10), in the open configuration. One skilled in the art will understand that the force can be exerted on the lever 24 by the support cable 18 when the support cable 18 is engaged with the lever 24 in other installation configurations of the cable block 10. For example and without being limitative, the support cable 18 can be engaged with the lever 24 as the support cable 18 is moved sideways or downwardly, with the cable block 10 being oriented accordingly.

In the embodiment shown, the lever 24 has an arcuate profile (i.e. the lever 24 is hook shaped) and the inner surface 21 of the upper section 20 of the frame 12 defines a support cable engagement section 25 extending along at least a portion of the inner surface of the lever 24. The support cable engagement section 25 has a concave profile, with the curvature being opened upwardly, when the cable block 10 is configured in the open configuration. Such a design facilitates the initial engagement of the support cable 18 with the upper section 20 (i.e. with the lever 25), for installation of the cable block 10 on the support cable 18, by an installator positioning the cable block 10 with an installation pole 60, from the ground, often several feet below the position where the engagement between the support cable 18 and the cable block 10 occurs. In order to further facilitate installation of the cable block 10 from the ground, in an embodiment, the bottom of the support cable engagement section 25 (i.e. the lowest portion of the support cable engagement section 25 when the cable block 10 is configured in the open configuration) is substantially vertically aligned with the pivot point 26a of the upper section 20 of the frame 12 (substantially aligned along a cable block longitudinal axis Y), with the pivot point being substantially vertically aligned (i.e. substantially aligned along the vertical axis X) with an outer surface of the lower section 30 of the frame 12, thereby providing visual guidance to the installator for positioning the cable block 10 with regard to the support cable 18 for initial engagement therebetween. Indeed, in such embodiment, an installator can simply substantially align the support cable 18 with the corresponding outer surface of the lower section 30 of the frame 12, to engage the support cable 18 with the support cable engagement section 25.

As will be understood, since the lever 24 extends on an opposite side of the pivot point 26a than the remaining of the upper section 20 of the frame 12, once the installer has positioned the cable block 10 to engage the support cable 18 in the support cable engagement section 25, the installer can subsequently exert a force (i.e. a pressure) on the lever 24, by pushing the cable block 10 onto the support cable 18 with a slight angle towards the latch end 38 of the lower section 30 of the frame 12, to drive the upper section 20 of the frame 12 in rotation, and move the cable block 10 from the open configuration to the closed configuration.

In an embodiment, the upper section 20 of the frame 12 further includes an outer abutment shoulder 27 positioned proximate to the pivot point 26a. The outer abutment shoulder 27 is defined in the outer surface of the upper section 20 of the frame 12 and is abuttable with a corresponding abutment shoulder 37 of the lower section 30 of the frame 12, to limit the pivoting of the upper section 20 of the frame 12 when it is configured in the open configuration. In other words, the outer abutment shoulder 27 of the upper section 20 of the frame 12 and the outer abutment shoulder 37 of the lower section 30 of the frame 12 are positioned, sized and shaped to allow the upper section 20 of the frame 12 to pivot of a predetermined angular distance when moved to the open configuration. Once the predetermined angular distance is reached, the outer abutment shoulder 27 of the upper section 20 and the outer abutment shoulder 37 of the lower section 30 abut onto one another, to prevent further pivoting of the upper section 20. In the course of the present document, the angular distance is understood to design the angular pivoting of the upper section 20 between a substantially horizontal position reached when the cable block 10 is in the closed configuration and the open configuration.

The above-mentioned angular distance for pivoting of the upper section 20 of the frame 12 into the open configuration, allows the cable block 10 to remain in the open configuration, when configured in this configuration and held substantially vertically. At the same time, the angular distance still allows pivoting of the upper section 20 towards the closed configuration, upon exertion of a reasonable force on the lever 24, in a downward direction (i.e. without requiring a great force being exerted on the lever 24 and/or without requiring a specific movement of the cable block 10 with a pressure being exerted on the lever 24). In an embodiment, the angular distance ranges between about 61° and about 110°.

In an embodiment, the lower section 30 of the frame 12 includes a lever receiving depression 32 sized and shaped to receive therein at least a section of the lever 24, when the cable block 10 is configured in the closed configuration. The lever receiving depression 32 allows the lower section 30 of the frame 12 to provide lateral support to the lever 24, when the cable block 10 is configured in the closed configuration, therefore providing a greater rigidity to the cable block 10, when the cable block 10 is configured in the closed configuration.

In an embodiment, the lever receiving depression 32 is sized and shaped to allow a tip of the lever 24 to extend into the inner opening 16, when the cable block 10 is configured in the closed configuration. In such an embodiment, the section of the lever 24 extending in the inner opening 16, when the cable block 10 is configured in the closed configuration, remains in contact with the support cable 18 to allow a further force to be exerted on the upper section 20 of the frame 12, to allow the latch 50 to lock the cable block 10 in the closed configuration, as will be described in more details below.

In an embodiment, the lower section 30 of the frame 12 is U-shaped and configured to receive a main sheave 40 (or pulley) having a concave inner surface 41. As can be seen, the inner surface 41 of the main sheave 40 defines the lower section of the inner opening 16 of the frame 12. When an aerial cable (not shown) is inserted in the inner opening 16 of the frame 12, it is supported on the main sheave 40 to minimize the required tensile force during the installation (i.e. the unwinding) of the aerial cable (not shown). In the embodiment shown, the lower section 30 of the frame 12 includes sheave covering shoulders 34 providing a widening of an inner surface 31 of the lower section 30 of the frame 12 substantially matching a height of the main sheave 40, such that the inner surface 31 of the lower section 30 of the frame 12, above the main sheave 40, is substantially aligned with an inner 41 surface of the main sheave 40. The sheave covering shoulders 34 hence help to prevent the aerial cables (not shown) from getting wedged in a clearance defined between the main sheave 40 and the inner surface of the lower section 30 of the frame 12.

The main sheave 40 is mounted on an axle 42 engaged to the lower section 30 of the frame 12 and supporting the main sheave 40. Free rolling assemblies 44 are provided between the axle 42 and the corresponding section of the main sheave 40, to allow the main sheave 40 to rotate about the lower section 30 of the frame 12, with minimal friction, thereby minimizing the required tensile force during the installation (i.e. the unwinding) of the aerial cable (not shown).

In the embodiment shown, the axle 42 is a pin insertable in corresponding pin receiving apertures 42a defined in opposed sections of the lower section 30 of the frame 12, such that it extends through the opposed sections and within a central bore of the main sheave 40. Securement pins are also provided to secure the pin operating as the axle 42 in place and prevent the pin operating as the axle 42 from moving along the transversal axis X. One skilled in the art will understand that, in such an embodiment, securement pins apertures are also defined in the corresponding sections of the lower section 30 of the frame 12, transversally from the pin receiving apertures 42a. The use of a pin operating as the axle 42, provides a greater rigidity to the lower section 30 of the frame 12 and prevents undesired axial pressure being applied on the free rolling assemblies 44.

In an embodiment, the lower section 30 of the frame 12 also includes a pin 35 extending upwardly from the inner surface 31, at a bottom of the lower section 30 of the frame 12, under the main sheave 40. For example, the pin 35 can be used to engage a rope used by an installator to position the cable block 10 along the support cable 18. In such a case, the pin 35 prevents the rope from being caught in the main sheave 40 and compels the rope to remain centered in the lower section 30 of the frame 12 and balance the tension exerted on the components thereof.

Figure 9:
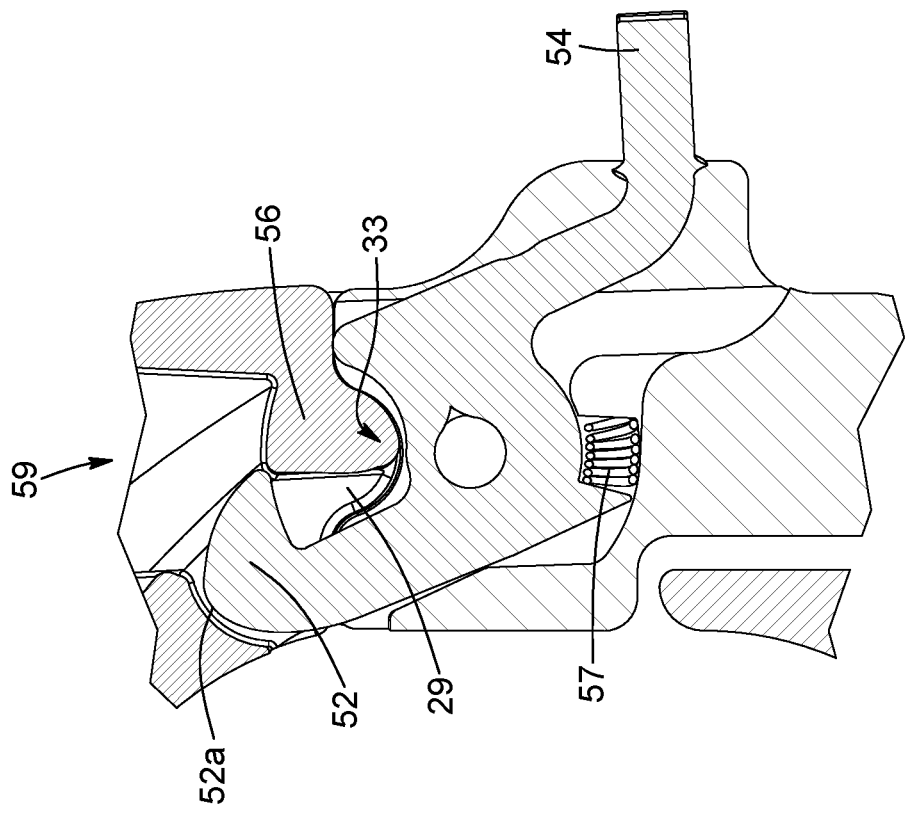
FIG. 9 is a cross-sectional view of a section of the cable block of FIG. 1, showing the latch of the cable block in the unlocked position.
Figure 8:
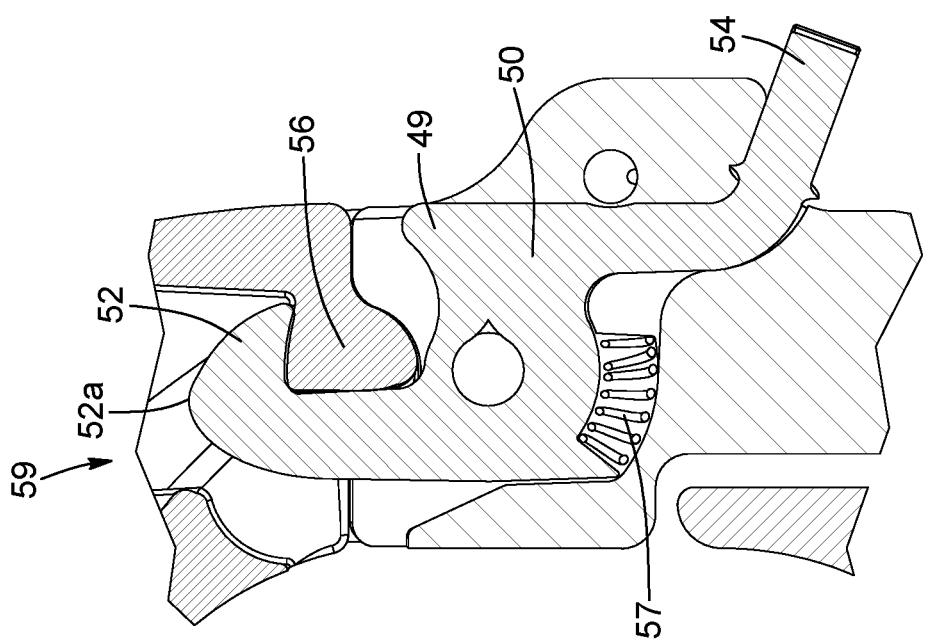
FIG. 8 is a cross-sectional view of a section of the cable block of FIG. 1, showing the latch of the cable block in the locked position.

Referring to FIGS. 3a, 8 and 9, the latch 50 of the cable block 10 is pivotally mounted to the lower section 30 of the frame 12 and includes a latching hook 52 at a first end and a latch engagement member 54 at a second opposed end. The latch 50 is pivotable between a locking position (shown in FIG. 8) and a release position (shown in FIG. 9). The latch 50 pivots about a latch pivot point 58.

In order to receive the latching hook 52, the upper section 20 of the frame 12 includes a locking cavity 59 defined at the latch end 28, with a locking protrusion 56 extending therein. The latching hook 52 is engageable with the locking protrusion 56, when positioned in the locking position, to lock the cable block 10 in the closed configuration (i.e. to selectively maintain the latch end 28 of the upper section 20 of the frame 12 and the latch end 38 of the lower section 30 of the frame 12 in abutment with one another). In the embodiment shown, the locking protrusion 56 is substantially aligned with the latch pivot point 58 along the cable block longitudinal axis Y, when the cable block 10 is configured in the closed configuration.

In the embodiment shown, the latch engagement member 54 is T-shaped and is configured to be engageable with a standard installation pole 60 (see FIG. 10) to allow an operator to unlock the cable block 10 by engaging the latch engagement member 54 with a cable block engaging member 64 of the installation pole 60, while standing on the ground and move the latch 50 from the locking position to the release position. Such movement of the latch 50 from the locking position to the release position can be performed by engaging the cable block engaging member 64 with the latch engagement member 54 (between the latch engagement member 54 and a section of the outer surface of the frame 12) and pushing the latch 50 towards the release position by pushing the cable block engaging member 64 of the installation pole 60 against the outer surface of the frame 12. In an embodiment, the lateral opposed ends of the T-shaped latch engagement member 54 are curved to prevent undesired lateral disengagement between the cable block engaging member 64 of the installation pole 60 and the T-shaped latch engagement member 54.

In an embodiment, the lower section 30 of the frame 12 includes a set of latch projections 51 engageable by the cable block engaging member 64 of the installation pole 60 simultaneously with the T-shaped latch engagement member 54, to pivot the latch 50 between the locking position and the release position. The latch projections 51 are substantially evenly levelled and extend in opposite directions, substantially perpendicularly to the transversal axis X and the longitudinal axis Y of the cable block 10, above the latch engagement member 54. The latch projections 51 are sized and shaped to facilitate the alignment of the cable block engaging member 64 of the installation pole 60 with the latch engagement member 54 and the centering of the cable block engaging member 64 of the installation pole 60 with respect to the lower section 30 of the frame 12. In an embodiment, the latch projections 51 are conically shaped and have a base with a greater diameter than a head thereof.

In an embodiment, the lower section 30 of the frame 12 also includes a pole engaging section 39 substantially matching the shape of a lower portion of the cable block engaging member 64 of the installation pole 60 and engageable therewith. The pole engaging section 39 allows the cable block 10 to be supported on the the cable block engaging member 64 of the installation pole 60, when the cable block engaging member 64 of the installation pole 60 is simultaneously engaged with the T-shaped latch engagement member 54 and the pole engaging section 39. The pole engaging section 39 is located below the set of latch projections 51 and is proximal therewith. In the embodiment shown, the pole engaging section 39 is U-shaped to substantially match the U shape of the lower portion of the cable block engaging member 64 of the installation pole 60, but one skilled in the art will understand that, in alternative embodiments (not shown) other shapes could also be used.

The combination of the T-shaped latch engagement member 54 and the pole engaging section 39 allows the cable block 10 to be temporarily manipulated using the installation pole 60 (e.g. for installation of the cable block 10 on the support cable 18, by an installator standing on the ground several feet below the support cable 18), when the cable block engaging member 64 of the installation pole 60 is inserted between the frame 12 and the T-shaped latch engagement member 54 and engaged with the pole engaging section 39. In an embodiment, when the cable block engaging member 64 of the installation pole 60 is inserted between the frame 12 and the T-shaped latch engagement member 54 and engaged with the pole engaging section 39, the latch 50 is approximately half-open (i.e. the latch 50 is not positioned and maintained in the release position) to allow the locking of the latching hook 52 on the locking protrusion 56, as will be described in more details below, while being manipulated using the installation pole 60.

One skilled in the art will understand that, if the cable block 10 can be reached and directly manipulated by an installator (for example using a bucket truck) the latch 50 can also be opened manually by the installator (i.e. can be moved from the locking position to the release position (and vice-versa) by the installator, simply using its hands or another tool to engage the latch engagement member 54).

In the embodiments shown, the latching hook 52 has a rounded top 52a configured to cause the latching hook 52 to momentarily pivot from the locking position to the release position, when engaged by the locking protrusion 56, during the closure of the upper section 20 of the frame 12. Hence, during installation of the cable block 10, when the upper section 20 of the frame 12 is pivoted as a result of the force exerted on the lever 24 by the support cable (as described above), the locking protrusion 56 hits the rounded top 52a of the latching hook 52 and causes the latching hook 52 to momentarily pivot to the release position (and subsequently move back to the locking position), to lock onto the locking protrusion 56. In an embodiment, the weight of the upper section 20 of the frame 12 is not sufficient to cause the latching hook 52 to momentarily pivot to the release position and subsequently move back to the locking position, Hence, an additional force must be exerted on the lever 24, by pushing the support cable 18 thereagainst (against the section extending outside of the lever receiving depression) to cause the latching hook 52 to momentarily pivot to the release position.

In an embodiment, the latch 50 includes a latch projection 49 projecting upwardly from the latch 50, at the front thereof, and selectively abuttable against the latch end 28 of the upper section 20 of the frame 12. Hence, as the latch 50 is moved from the locking position to the release position, the latch projection 49 abuts against the latch end 28 of the upper section 20 of the frame 12 (after the latching hook 52 is released from the locking protrusion 56) to exert a pressure thereon and therefore facilitate the opening of the cable block 10 and prevent a possible jam thereof. Moreover, when the cable block 10 is moved from the open configuration to the closed configuration, the latch end 28 of the upper section 20 of the frame 12 hits the latch projection 49 and therefore accelerates the movement of the latch 50 towards the locking position.

In the embodiment shown, a biasing member 57 is provided to bias the latch 50 towards the locking position. However, in the embodiment shown, the size and shape of the latch 50 results in the latch 50 being biased towards the locking position, even without the assistance of the biasing member 57. In other words, the latch 50 is biased towards the locking position, by gravity, when the cable block 10 is positioned in its normal operating position (as shown in FIG. 3a). Hence, the latch 50 can function even in the case of malfunctioning of the biasing member 57, as a result of the eccentric mass of the latch 50.

In an embodiment, the lower section 30 of the frame 12 further includes locking bores 53 positioned proximate to the latch 50 and sized and shaped to receive a locking pin 55 therein. When the locking pin 55 is inserted in the locking bores 53, it prevents the latch 50 from being pivoted to the release position. Hence, the locking pin 55 can be inserted in the locking bores 53, when the cable block 10 must remain in the closed configuration, to prevent undesired movement of the latch 50, which would result in the cable block 10 transitioning to the open configuration.

In an embodiment, the lower section 30 of the frame 12 includes an alignment cavity 33 positioned at a top end of the latch end 38 and the upper section 20 of the frame 12 includes a matching alignment protrusion 29 at a bottom end of the latch end 28. The combination of the alignment cavity 33 of the lower section 30 of the frame 12 and the alignment protrusion 29 of the upper section 20 of the frame 12 allows the upper section 20 and the lower section 30 of the frame 12 to align when the cable block 10 is moved from the open configuration to the closed configuration. In the embodiment shown, the alignment cavity 33 of the lower section 30 of the frame 12 and the alignment protrusion 29 of the upper section 20 of the frame 12 are rounded to provide a progressive alignment of the upper section 20 engaging the lower section 30 of the frame 12, thereby compensating for any functional clearance and preventing lateral movement between the upper section 20 and the lower section 30 of the frame 12 once locked in the closed configuration. In an embodiment, the walls of the bottom end of the latch end 28 of the upper section 20 of the frame 12 are also beveled and a matching bevel is present in the matching walls of the walls of the cavity defined at the top end of the latch end 38 of the lower section 30 of the frame 12 to provide further progressive alignment of the upper section 20 engaging the lower section 30 of the frame 12.

Referring to FIGS. 1, 4 and 5, in the embodiment shown, the lower section 30 of the frame 12 further includes a pole connecting assembly 70 configured to selectively mount the cable block 10 to the cable block engaging member 64 of the installation pole 60 and temporarily securely maintain the cable block 10 thereon. The pole connecting assembly 70 also allows the installation pole 60 to be disengaged from the cable block 10, when such disengagement is desired (e.g. once the cable block 10 is securely installed on the support cable 18). One skilled in the art will understand that the pole connecting assembly 70 provides a second alternative for engaging the cable block 10 with the installation pole 60, which is more stable than the above described alternative of inserting the cable block engaging member 64 of the installation pole 60 between the frame 12 and the T-shaped latch engagement member 54 and engaging the cable block engaging member 64 with the pole engaging section 39 and can therefore be used to install the cable block 10 on support cables 18 which are harder to reach and necessitate a better stability of the cable block 10 on the installation pole 60.

Once again, in the embodiment shown, the pole connecting assembly 70 is designed to engage with an installation pole 60 having a cable block engaging member 64 similar to the one shown in FIG. 10. One skilled in the art will however understand that, in alternative embodiments, the pole connecting assembly 70 could be configured differently to engage an installation pole 60 having a cable block engaging member 64 different than the one shown in FIG. 10. In the embodiment shown, the pole connecting assembly 70 includes an upper connector 72 projecting laterally from the outer surface of the lower section 30 of the frame 12, on a corresponding side thereof, and having a pole receiving bore 74 defined therein. The pole receiving bore 74 is sized and shaped to substantially match the profile of the U-shaped upper section 65 of the cable block engaging member 64 of the installation pole 60, such that a section of the U-shaped upper section 65 is insertable therein. The pole connecting assembly 70 further includes a lower connector 76 also projecting laterally from the outer surface of the lower section 30 of the frame 12, on the same side as the upper connector 72. The lower connector 76 is C-shaped and therefore defines a hollow inner section 78, with an insertion channel 77 defined in the lower connector 76. The insertion channel 77 allows passage of a section of the hook 66 and the U-shaped upper section 65 of the cable block engaging member 64 to allow selective engagement/disengagement between the installation pole 60 and the cable block 10, as will be described in more details below.

The cable block 10 can be mounted to the installation pole 60 by moving the installation pole 60 upwardly with regard to the cable block 10, with a section of the U-shaped upper section 65 of the cable block engaging member 64 aligned with the pole receiving bore 74 of the upper connector 72, for insertion of the section of the U-shaped upper section 65 of the cable block engaging member 64 therein. In order to proceed to the above-described insertion of the section of the U-shaped upper section 65 of the cable block engaging member 64 in the pole receiving bore 74 of the upper connector 72, the hook 66 and the U-shaped upper section 65 of the cable block engaging member 64 must be oriented to allow them to move through the insertion channel 77 of the lower connector 76 (as shown in FIG. 5). Once the section of the U-shaped upper section 65 of the cable block engaging member 64 is inserted in the pole receiving bore 74 of the upper connector 72, the installation pole 60 is rotated to change the orientation of the hook 66 and the U-shaped upper section 65 of the cable block engaging member 64 to lock the installation pole 60 with the cable block 10 (as shown in FIG. 4). When the installation pole 60 is locked to the cable block 10 (as shown in FIG. 4), a section of the hook 66 is inserted in the hollow inner section 78 of the lower connector 76 and abuts against the lower connector 76 to provide enhanced stability to the combination of the cable block 10 and the installation pole 60. The orientation of the hook 66 and the U-shaped upper section 65 of the cable block engaging member 64 also prevents the cable block engaging member 64 from being disengaged from the cable block 10 by engaging the lower connector 76 with the hook 66 when the installation pole 60 is moved downwardly with regard to the cable block 10 (i.e. by preventing the hook 66 from moving through the insertion channel 77 of the lower connector 76).

To dismount the cable block 10 from the installation pole 60, the installation pole 60 is again rotated to change the orientation of the hook 66 and the U-shaped upper section 65 of the cable block engaging member 64 to unlock the installation pole 60 and the cable block 10 (i.e. the hook 66 and the U-shaped upper section 65 of the cable block engaging member 64 are again oriented to allow them to move through the insertion channel 77 of the lower connector 76 (as shown in FIG. 5)) and the installation pole 60 can be moved downwardly with regard to the cable block 10 (for example, once the cable block 10 is secured onto the support cable 18).

Figure 11:
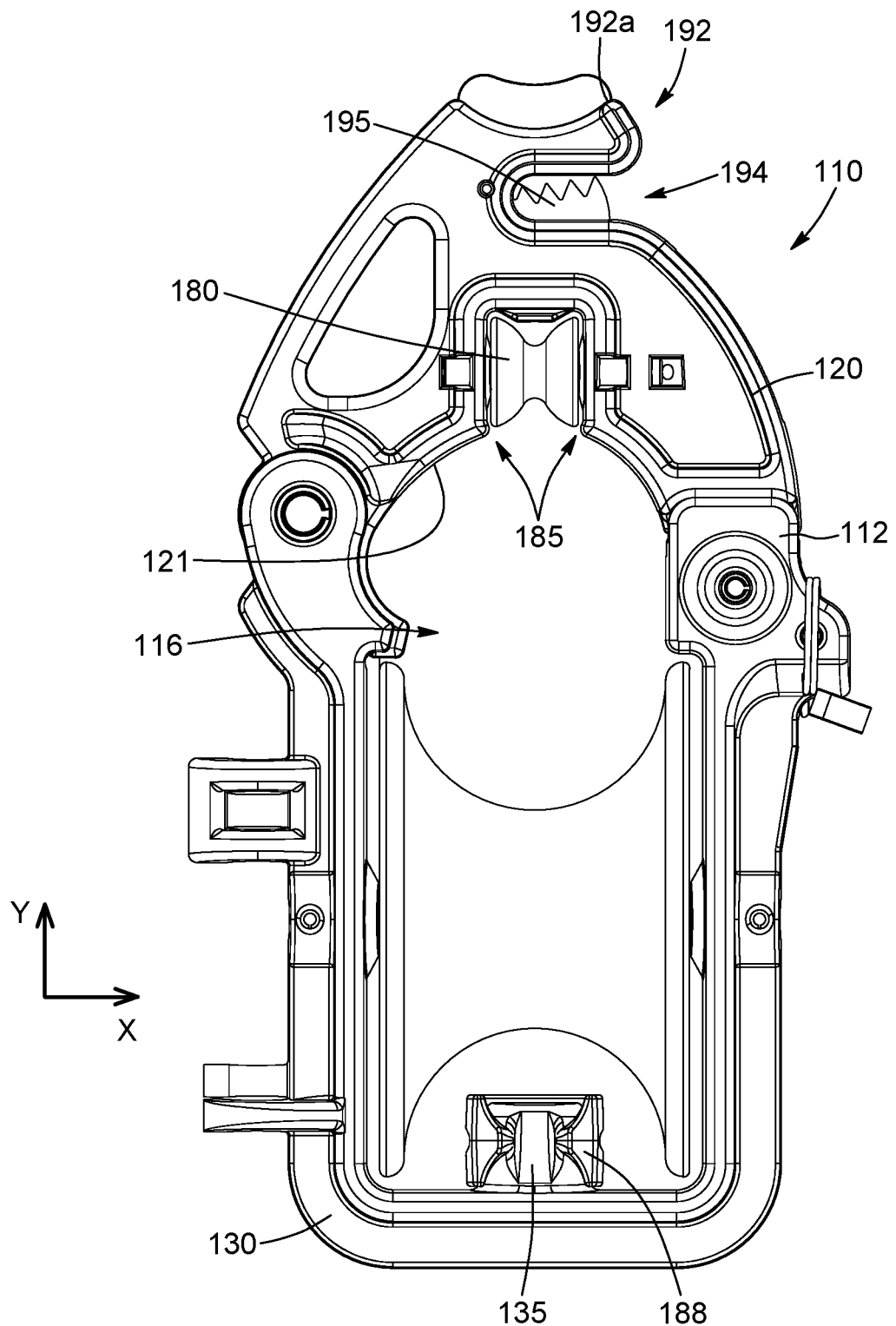
FIG. 11 is a front elevation view of a cable block in accordance with an alternative embodiment where the cable block includes an upper jaw, the cable block being shown in a closed configuration.
Figure 12:
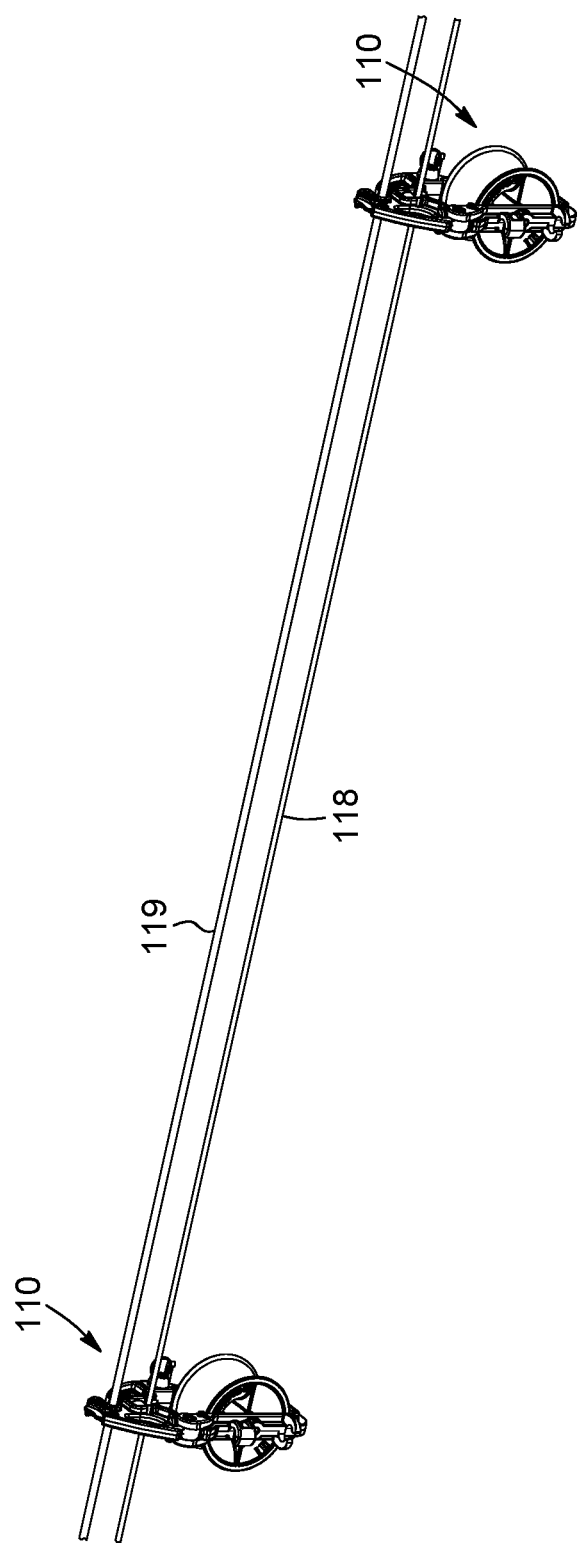
FIG. 12 is a graphical representation of the cable blocks of FIG. 11, mounted on a support cable and with an additional support link engaged therewith.
Figure 13A:
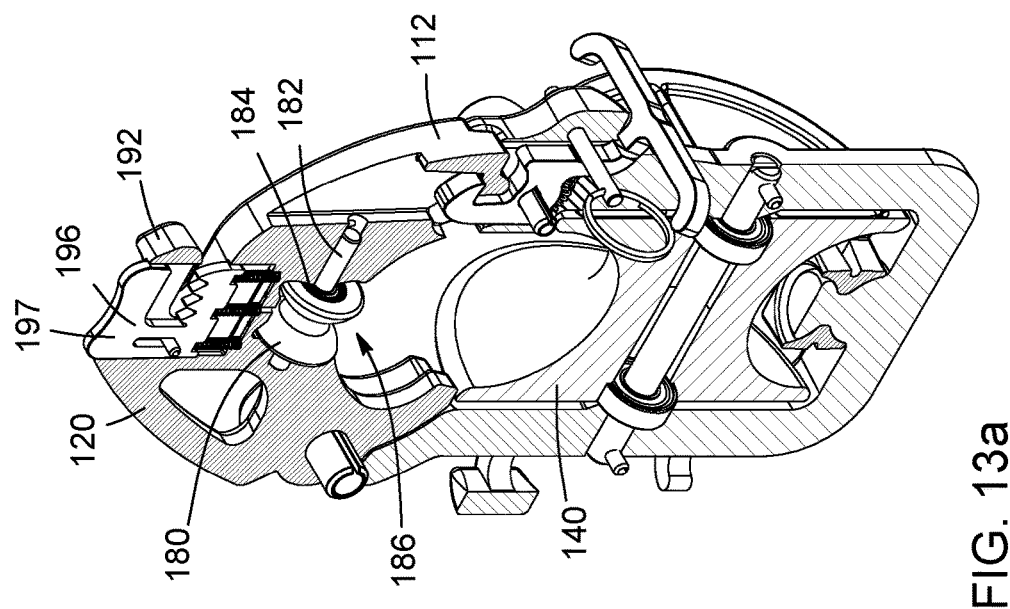
FIG. 13*a* is a cross-sectional view of the cable block of FIG. 11, taken along lines A-A in FIG. 13.
Figure 13:
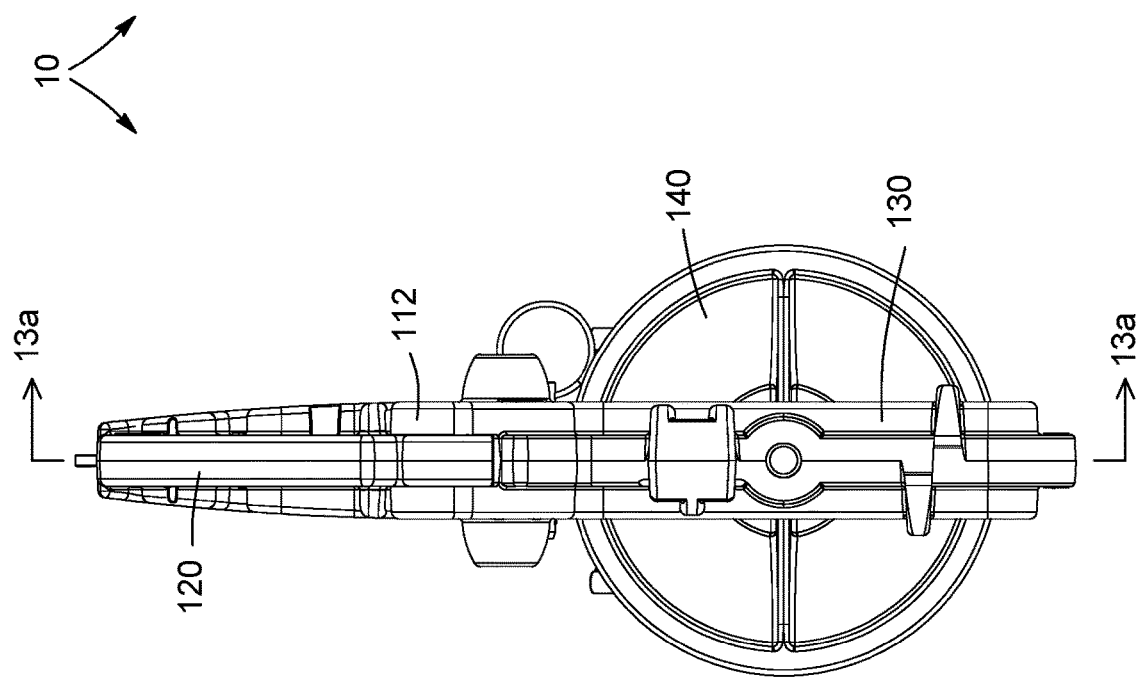
FIG. 13 is a left side elevation view of the cable block of FIG. 11, shown in the closed configuration.
Figure 15:
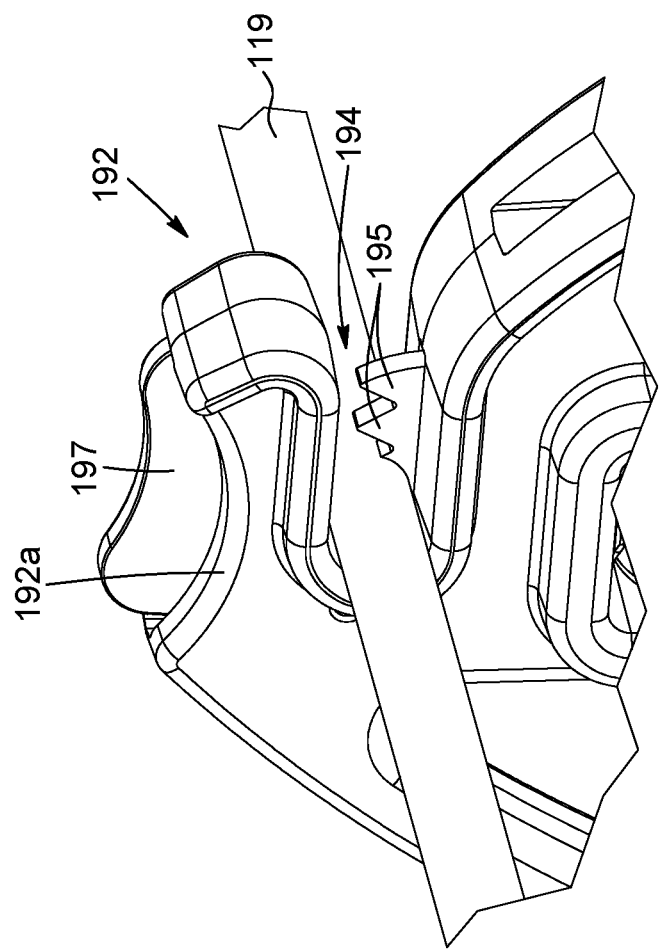
FIG. 15 is an enlarged view of a section of the cable block of FIG. 11, showing the upper jaw with the additional support link engaged therewith.
Figure 14:
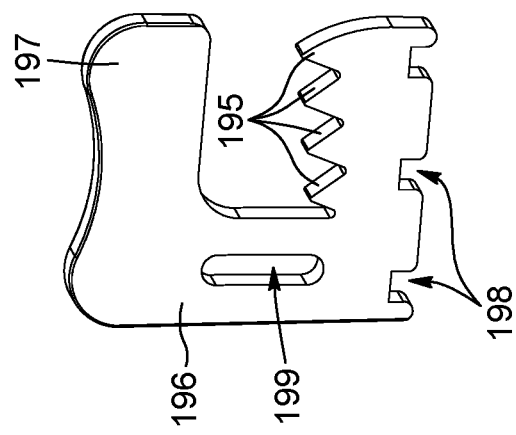
FIG. 14 is an isometric view of a wedging member of the cable block of FIG. 11, in accordance with an embodiment.

Now referring to FIGS. 11 to 17, there is shown an alternative embodiment of the cable block 10 wherein the features are numbered with reference numerals in the 100 series which correspond to the reference numerals of the previous embodiment. In the alternative embodiment shown in FIGS. 11 to 17, the cable block 110 is similar to the one of the previous embodiment, but includes additional features which allows the cable block 110 to be secured to an additional support link 119 (such as, for example and without being limitative, a guiding rope), for example for positioning and maintaining cable blocks 110 at a predetermined distance on the support cable 118, for example when installing cable blocks 110 on a support cable extending over an obstacle, such as a river, a road, a ravine or the like (as shown in FIG. 12), which prevents installators from directly mounting the cable blocks 110 onto the support cable 118, as described above. Hence, in such cases, the additional support link 119 is used to displace and subsequently maintain in place the cable blocks 110 with regard to the support cable 118.

The upper section 120 of the cable block 110 includes a jaw 192 extending on the outer surface of the frame 112, outside of the inner opening 116 of the frame 112. The jaw 192 is positioned at the top of the upper section 120 of the cable block 110 and is configured to frictionally secure the cable block 110 on the additional supporting link 119 (i.e. securely lock the cable block 110 onto the additional support link 119).

The jaw 192 has a support link receiving cavity 194 opened laterally (i.e. opened along the transversal axis). The support link receiving cavity 194 is defined by a section of the frame 112 projecting upwardly at the top of the upper section 120 of the frame 112, when the cable block 110 is configured in the closed configuration, and including a section extending transversally and spaced apart from the upper surface of the top of the upper section 120 of the frame 112. The top surface of this section extending transversally defines the upper surface 192*a* of the jaw 192.

The jaw 192 also includes a series of teeth 195 selectively projecting in the support link receiving cavity 194. In the embodiment shown, the series of teeth 195 are defined in a support link wedging member 196 movable along the cable block longitudinal axis Y. In an embodiment, the support link wedging member 196 is biased upwardly (is biased in a direction such as to bias the series of teeth 195 extending below the support link receiving cavity 194 towards the support link receiving cavity 194) and includes a push down section 197 projecting from the upper surface 192*a* of the jaw 192, when the series of teeth 195 project in the support link receiving cavity 194. Hence, in operation, to move the series of teeth 195 away from the support link receiving cavity 194 (for example to insert the additional support link 119 in the support link receiving cavity 194), a downward pressure is applied on the push down section 197 (for example using an operator hand or the hook of the block engaging member of the installation pole). Once the pressure is released, the support link wedging member 196 is again biased upwardly and the teeth 195 extend in the support link receiving cavity 194 to engage the additional support link 119 and securely maintain the cable block 110 in position thereon.

In the embodiment show, the support link wedging member 196 is spring biased and includes spring receiving slots 198, at a bottom end thereof, to receive springs therein. One skilled in the art will however understand that, in alternative embodiments (not shown) the support link wedging member 196 could be biased upwardly using biasing means different than springs. In the embodiment shown, the support link wedging member 196 also includes an elongated slit 199 to receive a pin therein and help preload the springs (not shown) and allow the support link wedging member 196 to remain in its corresponding cavity.

In the embodiment shown, the top of the push down section 197 of the support link wedging member 196 and the upper surface 192*a* of the jaw 192 are concave (i.e. have a concave profile), in order to facilitate the exertion of pressure thereon by a user, when desired. Moreover, in the embodiment shown, the teeth of the series of teeth 195 have an arcuate profile and are curved inwardly (i.e. are curved towards an inner end of the support link receiving cavity 194) and their apexes define an inclined plane oriented towards the inner end of the support link receiving cavity 194 (i.e. define a slope towards the inside of the support link receiving cavity 194) to ease insertion of the additional support link 119 if the teeth 195 are not completely pushed away from the support link receiving cavity 194 and provide a better grip on the additional support link 119 when engaged thereto.

In the embodiment shown, to be movable onto the support cable 118, the upper section 120 of the cable block 110 further includes a support cable engaging sheave 180 (rather than the V-shaped notch 22 of the above described embodiment). The support cable engaging sheave 180 is sized and shaped to engage the support cable 118 therein once the cable block 110 is engaged with the support cable 118 and the cable block 110 is configured in the closed configuration. The support cable engaging sheave 180 is mounted on an axle 182 engaged to the upper section 120 of the frame 112 and supporting the support cable engaging sheave 180. Free rolling assemblies 184 are mounted to the axle 182 and allow the support cable engaging sheave 180 to rotate about the upper section 120 of the frame 112, with minimal friction, thereby minimizing the required tensile force during displacement of the cable blocks 110 on the support cable 118.

In the embodiment shown, the support cable engaging sheave 180 is positioned in a sheave receiving cavity 186 defined in the upper section 120 of the frame 112. In order to prevent the support cable 118 from being wedged between the support cable engaging sheave 180 and an inner surface defining the sheave receiving cavity 186, protrusions 185 extending into the sheave receiving cavity 186 are provided at a lower end of the sheave receiving cavity 186. The protrusions 185 minimize the space between the inner surface defining the sheave receiving cavity 186 and the sheave, at the entrance of the sheave receiving cavity 186.

Figure 17:
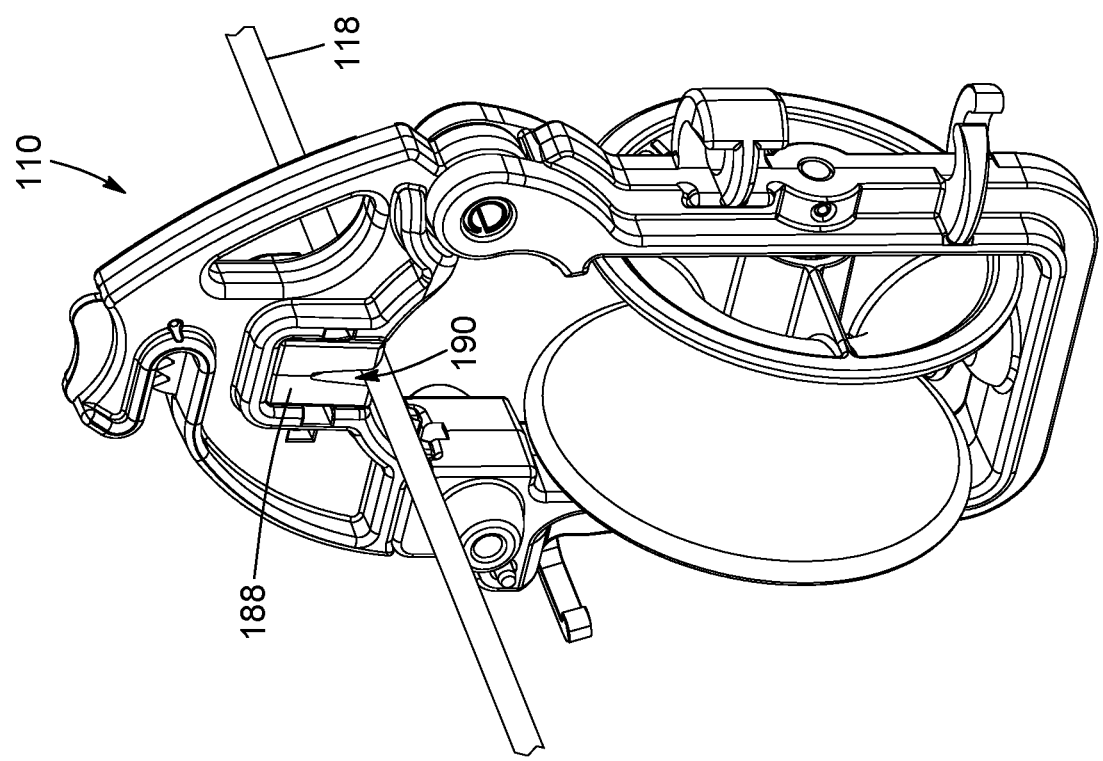
FIG. 17 is an isometric view of the cable block of FIG. 11 with the sheave lock mounted over the support cable engaging sheave and engaged to a support cable.
Figure 16:
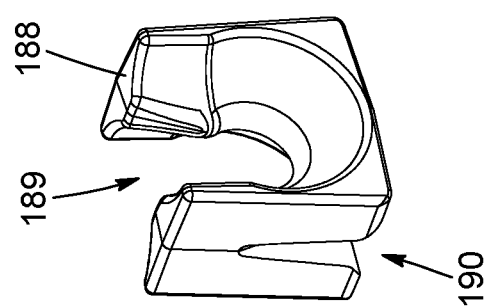
FIG. 16 is an isometric view of a sheave lock of the cable block of FIG. 11.

Referring to FIGS. 16 and 17, in an embodiment, the cable block 110 further includes a sheave lock 188 mountable in the sheave receiving cavity 186, over the support cable engaging sheave 180. The sheave lock 188 is sized to fit in the sheave receiving cavity 186 and has a body including a sheave engaging cavity 189 sized and shaped to receive the support cable engaging sheave 180 therein. The sheave lock 188 is made of resilient material to allow the body thereof to momentarily distort, to open the sheave engaging cavity 189 and therefore mount the sheave lock onto the support cable engaging sheave 180. The sheave lock 188 also includes a V-shaped notch 190 opened in the inner surface 121 of the upper section 120 of the frame 112 and extending upwardly therefrom, when the sheave lock 188 is mounted over the support cable engaging sheave 180. The V-shaped notch 190 of the sheave lock 188 allows the cable block 110 to be used without the above mentioned additional supporting link, similarly to the cable block 10 of the initial embodiment shown, to maintain the position of the cable block 110 on the support cable 118. Hence, the V-shaped notch 190 is sized and shaped to wedge the support cable 118 therein once the cable block 110 is installed on the support cable 118 and the cable block 110 is configured in the closed configuration. Hence, when the support cable 118 is wedged in the V-shaped notch 190, the support cable 118 is maintained therein in a friction fit, therefore resulting in sufficient friction between the cable block 110 and the support cable 118 to substantially prevent the cable block 110 from moving along the support cable 118, for example during the installation (or unwinding) of the aerial cable(s) (not shown), while still allowing movement of the cable block 110 along the support cable 118 when sufficient force is applied on the cable block 110.

In an embodiment, the pin 135 extending upwardly from the bottom of the lower section 130 of the frame 112 and towards the main sheave 140 is shaped similarly to the support cable engaging sheave 180, therefore allowing the sheave lock 188 to be mounted thereon, when not mounted in the sheave receiving cavity 186, over the support cable engaging sheave 180 (see FIG. 11).

One skilled in the art will therefore understand that the sheave lock 188 can be mounted/dismounted to the cable block 110, depending on whether the cable block 110 is to be used with an additional support link 119 maintaining the position of the cable block 110 with regard to the support cable 118, or without the additional support link 119, with the cable block 110 requiring additional friction with the support cable 118 to maintain its position thereon.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A cable block engageable with a support cable and configurable between an open configuration and a closed configuration, the cable block comprising:
   a frame having an upper section and a lower section hingedly connected to one another at a pivot point and together defining an inner opening having a lower portion and being shaped and sized to receive the support cable, the upper section of the frame comprising:
      a hinge connecting end hingedly connected to the lower section of the frame at the pivot point; and
      a lever defined at the hinge connecting end and extending on an opposite side of the pivot point than the remaining of the upper section of the frame, the lever being configured to extend into the inner opening and be engageable with the support cable, when the cable block is configured in the open configuration, and to drive the upper section of the frame in rotation upon a force being exerted on the lever by the support cable, to move the cable block from the open configuration to the closed configuration;
   a latch having a latching hook engageable with a locking protrusion of the frame to lock the cable block in the closed configuration upon transition of the cable block from the open configuration to the closed configuration, the latching hook pivoting momentarily from a locking position to a release position during the closure of the upper section of the frame and subsequently moving back to the locking position to lock onto the locking protrusion;
   a main sheave rotatably mounted to the frame in the lower section thereof and having a section defining the lower portion of the inner opening.

2. The cable block of claim 1, wherein the lever has an arcuate profile and the upper section of the frame comprises an inner surface defining a support cable engagement section having a concave profile and extending along at least a portion of the lever, the concave profile being opened upwardly, when the cable block is configured in the open configuration and a bottom of the support cable engagement section being substantially vertically aligned with the pivot point of the upper section of the frame.

3. The cable block of claim 2, wherein the lower section of the frame includes a lever receiving depression sized and shaped to receive at least a section of the lever, when the cable block is configured in the closed configuration, the lever receiving depression being sized and shaped to allow a section of the lever to extend into the inner opening of the frame when the cable block is configured in the closed configuration.

4. The cable block of claim 2, wherein the latch includes a T-shaped latch engagement member engageable to pivot the latch between the locking position and the release position.

5. The cable block of claim 4 in combination with an installation pole having an engaging member, wherein the frame includes a pole engaging section substantially matching the shape of a portion of the engaging member of the installation pole and engageable therewith to support the cable block on the engaging member of the installation pole when the engaging member of the installation pole is simultaneously engaged with the T-shaped latch engagement member and the pole engaging section.

6. The cable block in combination with an installation pole of claim 5, wherein the frame includes latch engaging projections engageable by the section of the installation pole simultaneously with the T-shaped latch engagement member, to pivot the latch between the locking position and the release position.

7. The cable block of claim 4, wherein the lower section of the frame further includes a pole connecting assembly configured to selectively mount the cable block to a cable block engaging member of an installation pole and selectively securely maintain the cable block thereon.

8. The cable block of claim 7, wherein the pole connecting assembly includes an upper connector projecting laterally from an outer surface of the lower section of the frame, on a corresponding side thereof and having a pole receiving bore defined therein and a lower connector also projecting laterally from the outer surface of the lower section of the frame, on the same side as the upper connector, the lower connector being C-shaped and defining a hollow inner section with an insertion channel.

9. The cable block of claim 1, wherein the lower section of the frame includes a lever receiving depression sized and shaped to receive at least a section of the lever, when the cable block is configured in the closed configuration, the lever receiving depression being sized and shaped to allow a section of the lever to extend into the inner opening of the frame when the cable block is configured in the closed configuration.

10. The cable block of claim 9, wherein the latch includes a T-shaped latch engagement member engageable to pivot the latch between the locking position and the release position.

11. The cable block of claim 10 in combination with an installation pole having an engaging member, wherein the frame includes a pole engaging section substantially matching the shape of a portion of the engaging member of the installation pole and engageable therewith to support the cable block on the engaging member of the installation pole when the engaging member of the installation pole is simultaneously engaged with the T-shaped latch engagement member and the pole engaging section.

12. The cable block in combination with an installation pole of claim 11, wherein the frame includes latch engaging projections engageable by the section of the installation pole simultaneously with the T-shaped latch engagement member, to pivot the latch between the locking position and the release position.

13. The cable block of claim 10, wherein the lower section of the frame further includes a pole connecting assembly configured to selectively mount the cable block to a cable block engaging member of an installation pole and selectively securely maintain the cable block thereon.

14. The cable block of claim 13, wherein the pole connecting assembly includes an upper connector projecting laterally from an outer surface of the lower section of the frame, on a corresponding side thereof and having a pole receiving bore defined therein and a lower connector also projecting laterally from the outer surface of the lower section of the frame, on the same side as the upper connector, the lower connector being C-shaped and defining a hollow inner section with an insertion channel.

15. The cable block of claim 1, wherein the latch includes a T-shaped latch engagement member engageable to pivot the latch between the locking position and the release position.

16. The cable block of claim 15 in combination with an installation pole having an engaging member, wherein the frame includes a pole engaging section substantially matching the shape of a portion of the engaging member of the installation pole and engageable therewith to support the cable block on the engaging member of the installation pole when the engaging member of the installation pole is simultaneously engaged with the T-shaped latch engagement member and the pole engaging section.

17. The cable block in combination with an installation pole of claim 16, wherein the frame includes latch engaging projections engageable by the section of the installation pole simultaneously with the T-shaped latch engagement member, to pivot the latch between the locking position and the release position.

18. The cable block of claim 15, wherein the lower section of the frame further includes a pole connecting assembly configured to selectively mount the cable block to a cable block engaging member of an installation pole and selectively securely maintain the cable block thereon.

19. The cable block of claim 18, wherein the pole connecting assembly includes an upper connector projecting laterally from an outer surface of the lower section of the frame, on a corresponding side thereof and having a pole receiving bore defined therein and a lower connector also projecting laterally from the outer surface of the lower section of the frame, on the same side as the upper connector, the lower connector being C-shaped and defining a hollow inner section with an insertion channel.

* * * * *